United States Patent
Imoto et al.

(10) Patent No.: US 7,837,017 B2
(45) Date of Patent: Nov. 23, 2010

(54) HIGH-FRICTION FLUID SEAL AND SHOCK ABSORBER

(75) Inventors: Chikashi Imoto, Inuyama (JP); Masatami Tsukamoto, Kani (JP); Etsuro Nakada, Kani (JP)

(73) Assignee: Kayaba Industry Co., Ltd, Tokyo (JP)

( * ) Notice: Subject to any disclaimer, the term of this patent is extended or adjusted under 35 U.S.C. 154(b) by 0 days.

(21) Appl. No.: 12/267,607

(22) Filed: Nov. 9, 2008

(65) Prior Publication Data
US 2009/0152779 A1 Jun. 18, 2009

(30) Foreign Application Priority Data
Nov. 13, 2007 (JP) ............................. 2007-294013

(51) Int. Cl.
*F16F 9/36* (2006.01)
(52) U.S. Cl. .................... 188/322.17; 277/549; 277/560
(58) Field of Classification Search ......... 277/549–560; 188/322.16–322.17
See application file for complete search history.

(56) References Cited

U.S. PATENT DOCUMENTS

| 4,560,177 | A | * | 12/1985 | Riley, Jr. ..................... 277/558 |
| 5,649,709 | A | * | 7/1997 | Munekata et al. ........... 277/560 |
| 5,664,651 | A | * | 9/1997 | Miura et al. ........... 188/322.17 |
| 2002/0079650 | A1 | * | 6/2002 | Hosoda ..................... 277/549 |
| 2002/0092722 | A1 | * | 7/2002 | Hosoda et al. ......... 188/322.17 |
| 2007/0007731 | A1 | * | 1/2007 | Zahn ......................... 277/551 |

* cited by examiner

*Primary Examiner*—Christopher P Schwartz
(74) *Attorney, Agent, or Firm*—Hiroe + Associates; Taras P. Bemko (57) ABSTRACT

A high-friction fluid seal used for high-friction sealing, comprising a fluid seal lip provided on the working fluid filling side to intercept a working fluid; and a dust lip provided on the working fluid non-filling side (the outer side) of the fluid seal lip to intercept dust coming from the outside, wherein the thickness of a working fluid film formed on the extension stroke by the dust lip is smaller than the thickness of a working fluid film formed on the extension stroke by the fluid seal lip.

8 Claims, 7 Drawing Sheets

Fig. 1(b) $$h = \sqrt{\dfrac{8\mu V}{9\left|\dfrac{dp}{dx}\right|_{max}}}$$

$\left|\dfrac{dp}{dx}\right|_{max}$ : absolute value of maximum surface pressure inclination ($\theta 1$, $\theta 2$, etc.)

HIGH-FRICTION FLUID SEAL AND SHOCK ABSORBER

BACKGROUND OF THE INVENTION

The present invention relates to a high-friction fluid seal used for high-friction sealing which includes a fluid seal lip provided on the working fluid filling side to intercept a working fluid and a dust lip provided on the working fluid non-filling side (the outer side) of the fluid seal lip to intercept dust coming from the outside.

Also, the present invention relates to a cylinder-type shock absorber using a working fluid, which uses the aforementioned high-friction fluid seal as a seal between a piston rod and a cylinder body.

Shock absorbers, which are usually of a cylinder type, play a role in buffering external force by regulating the flow rate of a working fluid moving in the shock absorber, and are used for a suspension of a vehicle, an opening and closing part of a rear door of a vehicle, and the like.

The shock absorber described in Japanese Unexamined Patent Application Publication No. 2006-17161, which is one of the type of shock absorbers described above, is used for a vehicular suspension. In the sealing structure of the shock absorber, deformation preventing means (9b, 9c) (here, reference characters used in Japanese Unexamined Patent Application Publication No. 2006-17161 are shown in parentheses) are provided on an inclined face (9a) for lip storage of a rod guide (5) on the cylinder side with which the inner surface of an outer peripheral lip (18) of an oil seal (6) is in contact, by which seal failure caused by assembling work can be prevented.

The oil seal (6) used in this shock absorber has the same basic configuration as that of the high-friction fluid seal in accordance with the present invention. The oil seal (6) includes an oil lip (15) for intercepting working fluid ("working oil" in Japanese Unexamined Patent Application Publication No. 2006-17161), which is provided on the working fluid filling side, and a dust lip (14) for sealing dust coming from the outside, which is provided on the working fluid non-filling side (the outer side) of the oil seal (15).

Usually, a shock absorber used for a suspension is provided so that the tip end of the rod (4) is on the upside, and is configured so that the dust lip (14) thereof prevents dust (including rainwater and sometimes oil, etc. mixed in a puddle) coming from the outside from entering therein.

The dust lip (14) configured as described above cannot prevent oil film formed on the extension stroke of the oil lip (15), which comes inversely from the inside, from leaking out.

On the other hand, the shock absorber used for a suspension has a problem in that it is difficult to obtain a damping force at very low speeds and very small vibrations by the buffering action of working fluid. Therefore, in recent years, a high-friction fluid seal for high-friction sealing has been proposed which can obtain a damping force at very low speeds and very small vibrations by a frictional force between the fluid lip of fluid seal and a piston rod.

In this case, as a method for high-friction sealing, there are a method in which the friction coefficients of the working fluid and the material of the fluid seal are increased and a method in which the tightening force of the fluid seal on the piston rod (surface pressure of contact surface between both of the elements) is increased.

However, in both methods, a working fluid film formed on the contact surface between the fluid lip of the high-friction fluid seal and the piston rod is pushed out in the state in which the shock absorber is not operated for a long period of time (for example, parking time), so that the working fluid film may break.

Also, in the fluid seal for high-friction sealing, a slide of the contact surface, that is, the sliding contact between the fluid lip and the piston rod is restrained to a high degree.

Therefore, for these reasons, if the shock absorber using the high-friction fluid seal is left in an inoperative state for a long period of time, the fluid lip and the piston rod stick together. If the shock absorber is operated (the vehicle or the like is operated) in this state, a gap (opening) is formed in a part of the circumference of the contact surface between the fluid lip and the piston rod, and therefore the working fluid may leak out.

The working fluid leaking out of the fluid lip remains once in a fluid reservoir, which is a space between the fluid lip and the dust lip. However, since the dust lip does not prevent the working fluid from leaking from the inside of the dust lip to the outside thereof as described above, the working fluid leaking out of the fluid lip passes through the dust lip and is gradually discharged to the outer side (the atmosphere side), this state being judged to be working fluid leakage (oil leakage).

The working fluid leakage of this type occurs only when the vehicle is moved suddenly after being left for a long period of time, and the amount of leaking working fluid is also small. Therefore, this leakage differs from progressive leakage such that a flaw is induced at the outer periphery of the piston rod, resulting in leakage. However, this leakage gives a sense of unease to the user of vehicle, so that improvement has been demanded.

Figure 7A:
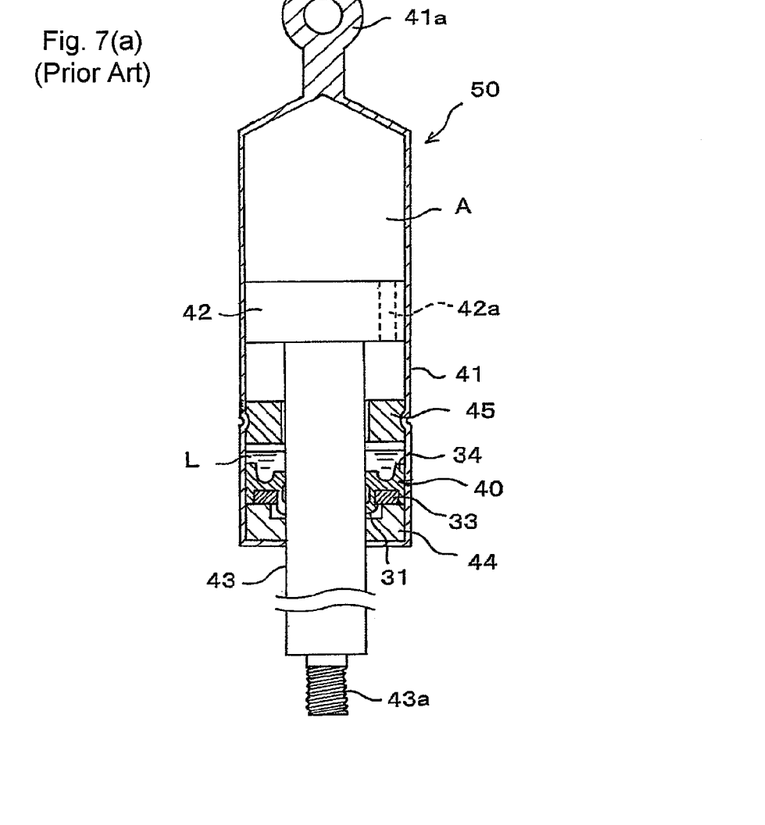
FIGS. 7(a)-7(c) are views showing a gas spring using a seal that is a background art of the present invention, FIG. 7(a) being a longitudinal sectional view of the gas spring, FIG. 7(b) being an enlarged sectional view of a part of the seal, and FIG. 7(c) being a partially enlarged sectional view of FIG. 7(b).
Figure 7B:
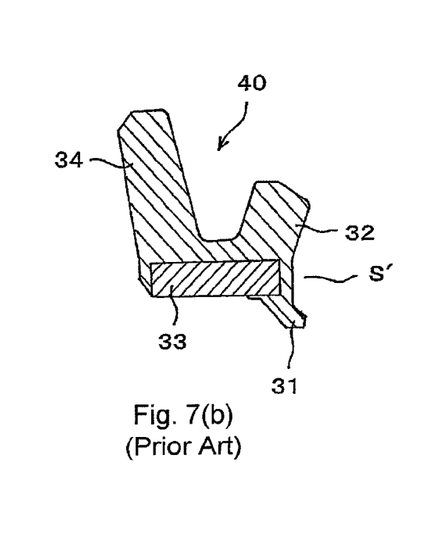
Figure 7C:
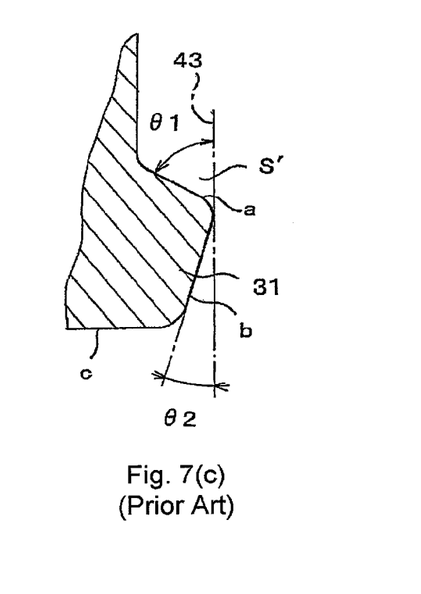

FIGS. 7(a)-7(c) show a background art of the present invention, showing a gas spring using a seal capable of preventing this leakage of working fluid. FIG. 7(a) is a longitudinal sectional view of the gas spring, FIG. 7(b) is an enlarged sectional view of a part of a seal, and FIG. 7(c) is a partially enlarged sectional view of FIG. 7(b). This gas spring (shock absorber) is one described in Japanese unexamined Patent Application Publication No. 2002-286067.

This gas spring 50 includes a seal 40 having the above-described features, and also includes a cylinder body 41, a body-side connecting part 41a, a piston 42, a piston rod 43, a rod-side connecting part 43a, a bearing 44, and a retainer 45 as the basic components of a shock absorber.

The interior of the cylinder body 41 is divided into a gas chamber A and a fluid chamber L by the piston 42. The piston 42 is provided with a port 42a, by which high-pressure gas in the gas chamber A can flow between the gas chamber A and the fluid chamber L.

By the above-described configuration, the gas spring 50 always urges a rear door in the opening direction and gives a proper damping force to the opening/closing movement of the rear door by means of the pressure of the high-pressure gas in the gas chamber A in a posture shown in FIG. 7(a), that is, in the state in which the body-side connecting part 41a is connected to the upper side (the rear door side) and the rod-side connecting part 43a is connected to the lower side (the vehicle body side).

The seal 40, which is a feature of the gas spring 50, includes a sub lip 31, a main lip 32, an insert metal 33, and an outer peripheral lip 34 as shown in FIG. 7(b). A fluid reservoir S', which is a space between the sub lip 31 and the main lip 32, is made a large space, as compared with the conventional gas spring, by providing the main lip 32 on the inside (the fluid chamber L side) of the insert metal 33 and the sub lip 31 on the outside thereof.

Also, as shown in FIG. 7(c), the lip tip end of the sub lip 31 is formed into a substantially trapezoidal shape. Specifically, the lip tip end of the sub lip 31 has an upper face a, a side face b, and a bottom face c, and an angle θ1 between the upper face a and the piston rod 43 is formed so as to be larger than an angle θ2 between the side face b and the piston rod 43. Thereby, the working fluid is prevented from leaking in such a manner that the lip tip end always scrapingly returns the working fluid in the fluid reservoir S' in the direction toward the fluid reservoir S' (paragraph [0030] of Japanese Unexamined Patent Application Publication No. 2002-286067).

By the above-described configuration, according to this gas spring 50, the working fluid can be prevented from leaking out of the sub lip 31. Also, in the case where the gas spring 50 is used in a posture such that the sub lip 31 is on the downside, a problem in that dust, water, and the like intrude from the outside is less liable to occur.

However, in the case where the gas spring 50 is used in a reverse posture as the shock absorber for vehicular suspension as described in Japanese Unexamined Patent Application Publication No. 2006-17161, that is, it is used in a posture such that the sub lip 31 is on the upside, the sub lip 31 cannot perform function as a dust lip, that is, cannot prevent dust and water coming from the upper outside from intruding. Therefore, the seal 40 of such a gas spring 50 cannot be used as a shock absorber for suspension. Japanese Unexamined Patent Application Publication No. 2006-17161 discloses a coarse face 9b serving as a deformation preventing means shown in FIGS. 1 and 3, and a protrusion 9c serving as a deformation preventing means shown in FIG. 4. Japanese Unexamined Patent Application Publication No. 2002-286067 discloses a seal 19 shown in FIGS. 1 to 3, and a sub lip 23 thereof.

SUMMARY OF THE INVENTION

The present invention has been made to solve the above problems, and accordingly an object thereof is to provide a high-friction fluid seal capable of solving a problem of working fluid leakage from a fluid lip while providing a dust lip capable of being used for a shock absorber for a suspension of a vehicle or the like, and a shock absorber provided with the aforementioned high-friction fluid seal.

A high-friction fluid seal of this invention is used for high-friction sealing, comprising a fluid seal lip provided on the working fluid filling side to intercept a working fluid, and a dust lip provided on the working fluid non-filling side (the outer side) of the fluid seal lip to intercept dust coming from the outside, wherein the thickness of a working fluid film formed on the extension stroke by the dust lip is made smaller than the thickness of a working fluid film formed on the extension stroke by the fluid seal lip.

In a cylinder-type shock absorber using a working fluid of this invention, the high-friction fluid seal described of this invention is used as a seal between a piston rod and a cylinder body.

In the high-friction fluid seal of this invention, because the thickness of a working fluid film formed on the extension stroke by the dust lip is made smaller than the thickness of a working fluid film formed on the extension stroke by the fluid seal lip, the problem of working fluid leakage from a fluid lip is solved, while providing a dust lip capable of being used for a shock absorber for a suspension of a vehicle or the like.

The cylinder-type shock absorber using a working fluid of this invention, wherein the high-friction fluid seal described of this invention is used as a seal between a piston rod and a cylinder body, can provide that effect of the high-friction fluid seal.

DETAILED DESCRIPTION OF THE PREFERRED EMBODIMENTS

The basic concept and embodiment of the present invention will now be described with reference to the accompanying drawings.

<Basic Principle of Fluid Seal and Basic Concept of the Present Invention>

Figure 1A:
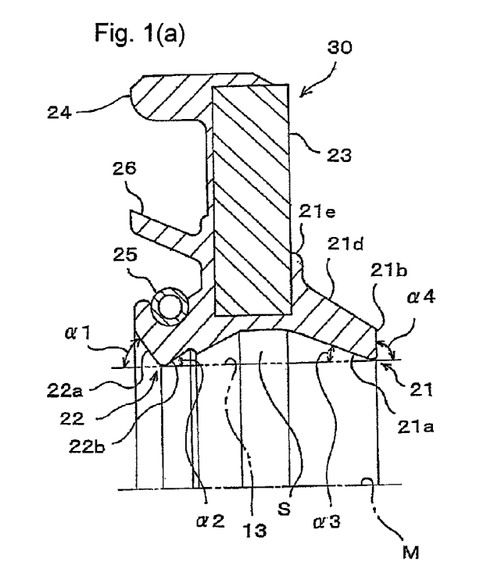
FIG. 1(a) is a sectional view showing an upper half of one example of a fluid seal having a basic configuration, which is the basis of a high-friction fluid seal in accordance with the present invention.
Figure 1B:
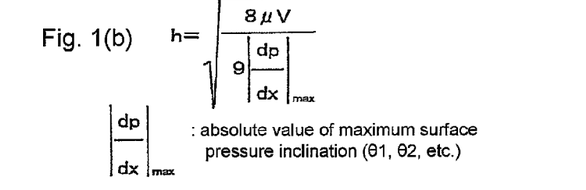
FIG. 1(b) is Equation 1 used for explaining the basic principle of FIG. 1(a)
Figure 1C:
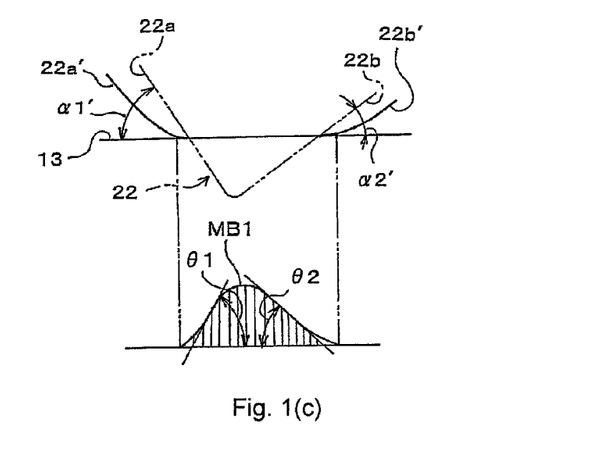
FIG. 1(c) is an explanatory view showing an inclined face of a fluid lip in the service state of FIG. 1(a) and the relationship between surface pressure distribution and maximum surface pressure inclination.
Figure 1D:
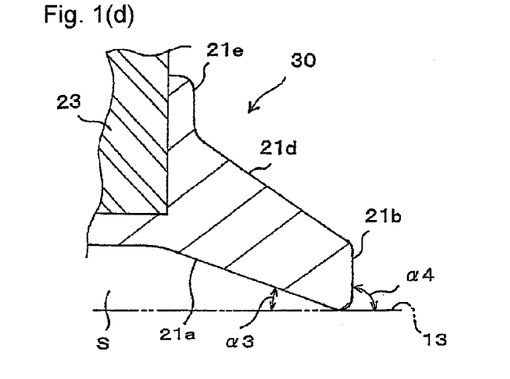
FIG. 1(d) is an enlarged sectional view of a dust lip.
Figure 1E:
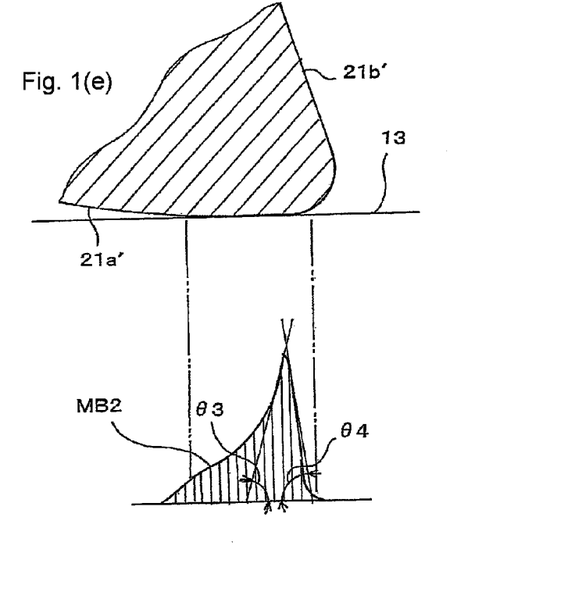
FIG. 1(e) is an explanatory view showing an inclined face of a dust lip in the service state of FIG. 1(a) and the relationship between surface pressure distribution and maximum surface pressure inclination.

FIG. 1(a) is a sectional view showing an upper half of one example of a fluid seal having a basic configuration, which is the basis of a high-friction fluid seal in accordance with the present invention, FIG. 1(b) is Equation 1 used for explaining the basic principle of FIG. 1(a), FIG. 1(c) is an explanatory view showing an inclined face of a fluid lip in the service state of FIG. 1(a) and the relationship between surface pressure distribution and maximum surface pressure inclination, FIG. 1(d) is an enlarged sectional view of a dust lip in FIG. 1(a), and FIG. 1(e) is an explanatory view showing an inclined face of a dust lip in the service state of FIG. 1(c) and the relationship between surface pressure distribution and maximum surface pressure inclination.

First, the basic principle of the fluid seal, which is the basis of the invention concept of a high-friction fluid seal in accordance with the present invention, is explained with reference to FIG. 1.

The fluid seal 30 shown in FIG. 1(a), which is used for a shock absorber for a suspension of a vehicle or the like, includes a dust lip 21 for preventing dust (including rainwater and sometimes oil, etc. mixed in a puddle) coming from the outside from intruding, a fluid seal lip 22 provided on the working fluid side of the dust lip 21 to prevent the working fluid on the inside from leaking, an insert metal 23 for supporting these lips 21 and 22, and an outer peripheral lip 24 provided on the outer periphery side of the insert metal 23.

Figure 6:
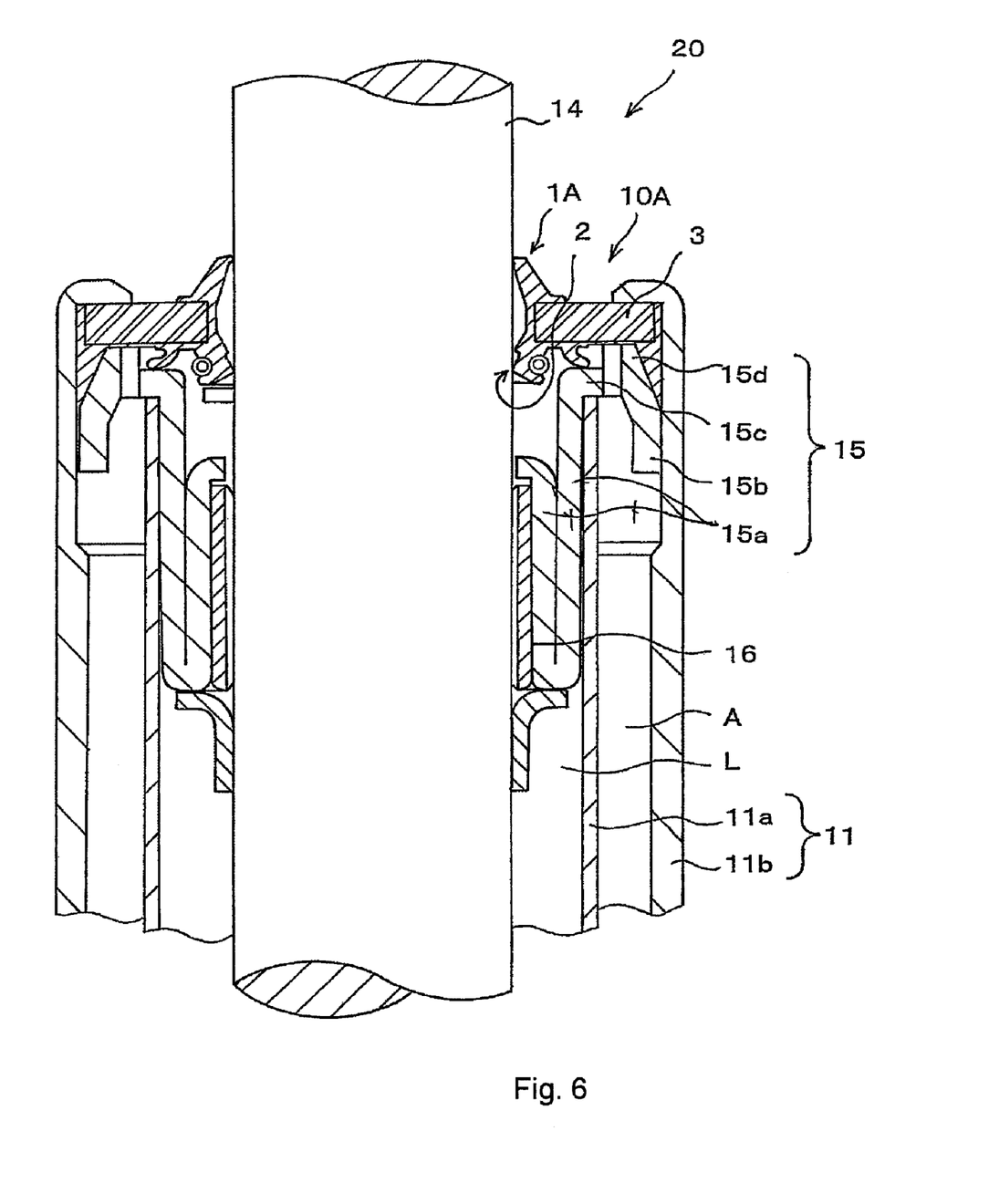
FIG. 6 is a longitudinal sectional view showing one example of a shock absorber using the high-friction fluid seal shown in FIG. 3(a)

On the outer periphery side of the fluid seal lip 22, a garter spring 25 is provided to adjust the tightening force of the fluid seal lip 22 on a piston rod 13 (indicated by an imaginary line of two-dot chain line in FIG. 1(a), refer to FIG. 6). Also, at an intermediate position in the radial direction between the outer peripheral lip 24 and the fluid seal lip 22 on the working fluid filling-side surface of the insert metal 23, an auxiliary lip 26 is provided so as to be in contact with the upper surface of a connecting part 15c (refer to FIG. 6) on the shock absorber side and be bent.

As shown in FIG. 1(a), the inclined face on the working fluid side of the fluid seal lip 22 is called a fluid seal lip fluid-side inclined face 22a, the inclined face on the dust lip 21 side thereof is called a fluid seal lip dust-side inclined face 22b, the inclined face on the fluid seal lip 22 (working fluid) side of the dust lip 21 is called a dust lip fluid-side inclined face 21a, and the inclined face on the working fluid non-filling side thereof is called a dust lip outer-side inclined face 21b.

An inclined part continuous with the dust-side inclined face 21b of the dust lip 21 is called an upper inclined part 21d, and a part in which the upper inclined part 21d is fixed to the outer side surface of the insert metal 23 is called a fixing part 21e. A symbol M denotes the axis centerline of a high-friction fluid seal 10.

Also, the angles between the fluid seal lip fluid-side inclined face 22a, the fluid seal lip dust-side inclined face 22b, the dust lip fluid-side inclined face 21a, and the dust lip outer-side inclined face 21b and the contact surface of the piston rod 13 to be sealed by these lips 22 and 21 (the rod axis center) are called a fluid seal lip fluid-side inclination angle $\alpha 1$, a fluid seal lip dust-side inclination angle $\alpha 2$, a dust lip fluid-side inclination angle $\alpha 3$, and a dust lip outer-side inclination angle $\alpha 4$, respectively.

Also, a space formed between the fluid seal lip 22 and the dust lip 21 so as to face to the piston rod 13 to be mounted is called a fluid reservoir S.

The following relationships hold between the above-described inclination angles $\alpha 1$ to $\alpha 4$.

Relationship 1: a relationship such that the fluid seal lip fluid-side inclination angle $\alpha 1$ is larger than the fluid seal lip dust-side inclination angle $\alpha 2$. Relationship 2: a relationship such that the dust lip outer-side inclination angle $\alpha 4$ is larger than the dust lip fluid-side inclination angle $\alpha 3$. The reason why the relationships 1 and 2 hold is explained.

FIG. 1(c) shows a service state of the fluid seal lip 22, that is, an enlarged view of a state in which the fluid seal lip 22 is mounted on the piston rod 13 of the shock absorber, and a surface pressure distribution MB1 on the contact surface between the fluid seal lip 22 and the piston rod 13.

As shown in FIG. 1(c), the surface pressure distribution MB1 takes a mountain shape, and the maximum surface pressure inclination lies on both sides of the mountain peak. The film thickness h of the working fluid is always determined by the surface pressure inclination on the side on which the working fluid is drawn. Therefore, if the case where the seal 30 is fixed and the piston rod 13 moves to the right direction (the working fluid non-filling direction) is taken as an extension stroke, a fluid-side extension stroke fluid film thickness h1 on the extension stroke is determined by a fluid seal lip fluid-side maximum surface pressure inclination $\theta 1$ on the left-hand side of the peak of surface pressure, and a fluid-side compression stroke fluid film thickness h2 on the compression stroke is determined by a fluid seal lip fluid-side inclined face angle $\theta 2$ on the right-hand side of the peak of surface pressure.

The mechanism of the working fluid flow of the fluid seal lip 22 can be explained as described below.

(1) Leakage means a state in which a scraped-out fluid film is deposited by repeated operation in the case where the fluid-side extension stroke fluid film thickness h1 formed on the extension stroke is larger than the fluid-side compression stroke fluid film thickness h2 formed on the compression stroke.

The fluid-side extension stroke fluid film thickness h1 formed on the extension stroke is the thickness of a working fluid film formed on the outer peripheral surface of the piston rod 13 after the lip 22 has passed through the piston rod 13, so that it is also called a formed film thickness h1.

Also, the fluid-side compression stroke fluid film thickness h2 formed on the compression stroke means a film thickness capable of taking in the working fluid film formed on the outer peripheral surface of the piston rod 13 to the working fluid filling side, so that it is also called a taking-in film thickness h2.

(2) Therefore, to prevent the working fluid leakage, the fluid-side extension stroke fluid film thickness (formed film thickness) h1 formed on the extension stroke must be made smaller than or at least almost equal to the fluid-side compression stroke fluid film thickness (taking-in film thickness) h2 formed on the compression stroke.

(3) The fluid film thickness is determined by Equation 1 shown in FIG. 1(b). In Equation 1, h is fluid film thickness, $\mu$ is working fluid viscosity, and V is velocity on the contact surface of the lip (in this example, on the piston rod).

The condition that fluid leakage does not occur is to make the formed film thickness h1 on the extension stroke not larger than the taking-in film thickness h2 on the compression stroke, and, as for the surface pressure inclination, to set the maximum surface pressure inclination $\theta 1$ on the extension stroke so as to be larger than the maximum surface pressure inclination $\theta 2$ on the compression stroke.

A simple setting method is as shown in FIG. 1(c). The fluid seal lip 22 has a triangular cross section in a non-service state, and the left-hand side thereof is the working fluid filling side, and the right-hand side thereof is the working fluid non-filling side (outer side). It is assumed that the working fluid leakage from the left-hand side to the right-hand side is prevented.

When it is assumed that the angle that the inclined face 22a on the left-hand side of the lip 22 makes with the axis line of the rod, that is, the contact surface of the lip 22 is taken as a fluid seal lip fluid-side inclination angle $\alpha 1$, the angle that the inclined face 22b on the right-hand side thereof makes with the axis line of the rod, that is, the contact surface of the lip 22 is taken as a fluid seal lip dust-side inclination angle $\alpha 2$, and $\alpha 1$ is larger than $\alpha 2$, the inclined faces in a service state become inclined faces 22a' and 22b' (hereinafter, for the inclined face in a service state with respect to the inclined face in a non-service state, ['] is added to the symbol), and the occurring surface pressure distribution MB1 becomes as shown in FIG. 1(c), having an asymmetrical shape in which the peak of surface pressure deviates to the left-hand side (the working fluid filling side).

The maximum surface pressure inclination $\theta 1$ on the left-hand side becomes larger than the maximum surface pressure inclination θ2 on the right-hand side, by which leakage can be prevented. This is the reason why relationship 1 is made hold generally for a fluid seal lip 22 of the fluid seal 30.

This principle is applied to the dust lip 21 in FIGS. 1(d) and 1(e). In the dust lip 21, the dust lip outer-side inclination angle α4 is larger than the dust lip fluid-side inclination angle α3. As a result, as shown in FIG. 1(e), a surface pressure distribution MB2 takes a mountain shape in which the peak of surface pressure deviates to the right-hand side (the outer side), and a dust lip outer-side maximum surface pressure inclination θ4 is larger than a dust lip fluid-side maximum surface pressure inclination θ3.

As a result, in the dust lip 21, a dust-side compression stroke fluid film thickness (taking-in film thickness) h4 is smaller than a dust-side extension stroke fluid film thickness (formed film thickness) h3, by which dust is prevented from intruding from the outside. This is the reason why relationship 2 is made hold generally for a fluid dust lip 1 of the fluid seal 30.

However, in the case where the high-friction fluid seal 10 provided with such a dust lip 1 is used as an oil seal for high-friction sealing of a suspension of a vehicle or the like, attention is not given to the relationship between the formed film thickness h3 and the formed film thickness h1 of the fluid seal lip 22 as shown by the fluid seal 30 having the basic configuration, and in the case where the formed film thickness h3 is larger than the formed film thickness h1 (usually, the formed film thickness h3 is larger than the formed film thickness h1 to increase the effect of the dust lip 21), the working fluid film leaking from the fluid seal lip 22 side is made pass through after the shock absorber has been left for a long period of time.

The shapes of the inclined faces 21a and 21b of such a dust lip 21 are fit for the purpose of preventing dust (including rainwater and sometimes oil, etc. mixed in a puddle) from intruding from the outside. However, in the case where the dust lip is used for high-friction sealing, the above-described drawbacks occur.

Thereupon, the applicant of the present invention paid attention to the relationship between the fluid-side extension stroke fluid film thickness h1 and the dust-side extension stroke fluid film thickness h3, which relationship has not attracted attention conventionally, and hit upon an idea that while the basic properties of the fluid seal lip and the dust lip are maintained, that is, a condition that for the fluid seal lip, the fluid-side compression stroke fluid film thickness h2 is made larger than the fluid-side extension stroke fluid film thickness h1, and for the dust lip, the dust-side extension stroke fluid film thickness h3 is made larger than the dust-side compression stroke fluid film thickness h4 is maintained, first, the dust-side extension stroke fluid film thickness h3 is made smaller than the fluid-side extension stroke fluid film thickness h1.

In this case, even if a fluid film of the fluid-side extension stroke fluid film thickness h1 is formed in the fluid seal lip on the extension stroke while the basic properties of these lips are maintained, of the fluid films, in the dust lip, only the fluid film of the dust-side extension stroke fluid film thickness h3 is allowed to be formed. If the dust-side extension stroke fluid film thickness h3 is made sufficiently small, the fluid film h3 formed on the piston rod on the outer side of the dust lip evaporates or gets scattered before depositing, so that the fluid film h3 can be made incapable of being recognized by the user.

That is to say, according to the high-friction fluid seal in which the dust-side extension stroke fluid film thickness h3 is made smaller than the fluid-side extension stroke fluid film thickness h1 (a first invention), the problem of working fluid leakage from the fluid seal lip can be solved while the dust lip capable of being used for a shock absorber for a suspension of a vehicle or the like is provided.

Although regarding the fluid seal provided with the fluid seal lip for intercepting a fluid and the dust lip for keeping out dust, attention has been given to the individual lip so that the lip fulfils the respective purpose, the first invention arrived at this high-friction fluid seal that functions as high-friction seal by cooperation of both of the lips, that is, serves as a seal system in which both of the lips are combined by hitting an idea that the dust lip is also anticipated newly in intercepting the working fluid.

Also, the first invention results in a fact that other conditions, for example, the tightening allowance on the piston rod forming the contact surface with which the fluid seal lip and the dust lip are in contact, are made appropriate, the above-described film thickness principle can be applied commonly to both of the lips, and as a result, the dust lip fluid-side maximum surface pressure inclination is made larger than the fluid seal lip fluid-side maximum surface pressure inclination (a second invention), and the effect thereof is also the same as described above.

Further, the first invention results in a fact that assuming that the same other conditions are met, in the service state, the dust lip fluid-side inclined face angle is made larger than the fluid seal lip fluid-side inclined face angle (a third invention), and the effect thereof is also the same as described above.

First Embodiment

Figure 2:
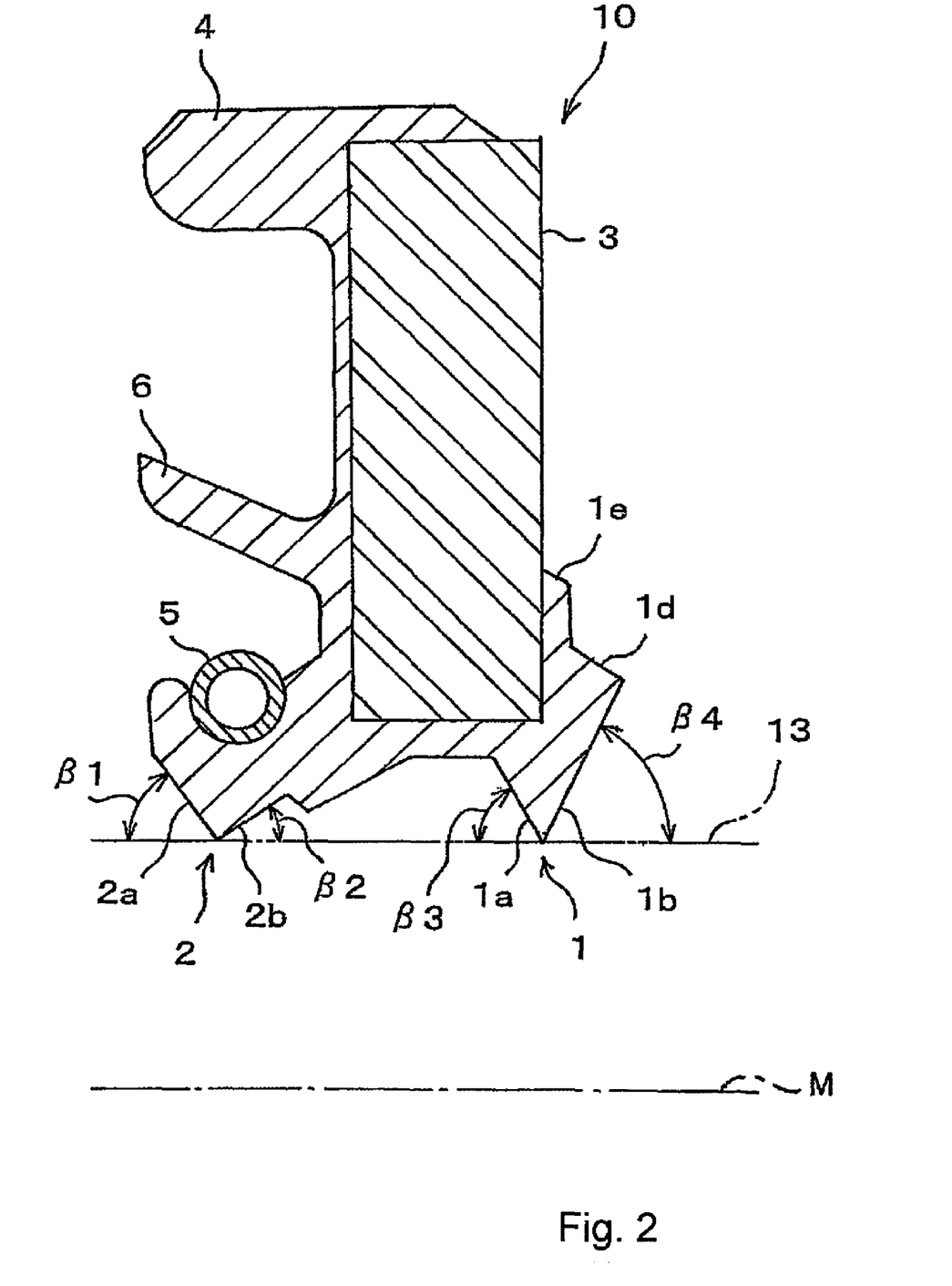
FIG. 2 is a sectional view showing one example of a high-friction fluid seal in accordance with the present invention.

FIG. 2 is a sectional view showing one example of the high-friction fluid seal in accordance with the present invention.

This high-friction fluid seal 10 embodies the third invention of the basic concept of the present invention, and like the high-friction fluid seal 10 shown in FIGS. 1(a)-1(e), is used for a shock absorber 20 used for a suspension of a vehicle or the like.

The high-friction fluid seal 10, which is used as a high-friction seal in industrial application fields like the fluid seal 30 shown in FIGS. 1(a)-1(e), includes, as basic components, a dust lip 21, a fluid seal lip 2, an insert metal 3, an outer peripheral lip 4, a garter spring 5, and an auxiliary lip 6 corresponding to the dust lip 21, the fluid seal lip 22, the insert metal 23, the outer peripheral lip 24, the garter spring 25, and the auxiliary lip 26 of the fluid seal 30, respectively.

The high-friction fluid seal 10 further includes an upper inclined part 1d and a fixing part 1e corresponding to the upper inclined part 21d and a fixing part 21e of the fluid seal 30 shown in FIGS. 1(a)-1(e), respectively. A symbol M denotes the axis centerline of the high-friction fluid seal 10, and after the high-friction fluid seal 10 has been mounted to the shock absorber 30, the axis centerline M coincides with the axis center line of the piston rod 13 of the shock absorber 20.

Like the inclined faces of the lips 1 and 2, the inclined face on the fluid seal lip 2 side of the dust lip 1 is called a dust lip fluid-side inclined face 1a, the inclined face on the working fluid non-filling side thereof is called a dust lip outer-side inclined face 1b, the inclined face on the working fluid side of the fluid seal lip 2 is called a fluid seal lip fluid-side inclined face 2a, and the inclined face on the dust lip 1 side thereof is called a fluid seal lip dust-side inclined face 2b.

Also, like the angles of the inclined faces of the lips 21 and 22, the angles between the fluid seal lip fluid-side inclined face 2a, the fluid seal lip dust-side inclined face 2b, the dust lip fluid-side inclined face 1a, and the dust lip outer-side inclined face 1b and the contact surface of the piston rod 13 to be sealed by these lips 2 and 1 are called a fluid seal lip fluid-side inclination angle β1, a fluid seal lip dust-side inclination angle β2, a dust lip fluid-side inclination angle β3, and a dust lip outer-side inclination angle β4, respectively.

This high-friction fluid seal 10 differs from the fluid seal 30 shown in FIGS. 3(a)-3(d) in that the dust lip fluid-side inclination angle β3 is larger than the fluid seal lip fluid-side inclination angle β1.

Also, corresponding to the above-described fact, the dust lip 1 has a triangular shape that is similar to the shape of the fluid seal lip 2, the triangular shape extending almost directly below from the outer side of the insert metal 3 toward the piston rod 13, so that the length exerting an influence on the rigidity and flexibility of the dust lip 1 is short.

In this case, the dust lip fluid-side inclined face angle is larger than the fluid seal lip fluid-side inclined face angle in the service state, so that the effect of the third invention of the basic concept can be achieved more specifically. Also, this fact means that the effects of the second and first inventions can also be achieved.

Since the dust lip 1 has a short length, the high-friction fluid seal 10 can be applied to a case where vibrations in the radial direction, that is, transverse vibrations of the piston rod of the shock absorber are small. Also, since the dust lip outer-side inclination angle β4 cannot be made too large, the high-friction fluid seal 10 can be applied to industrial fields in which the dust seal effect is not demanded so much as compared with the ordinary case.

Second Embodiment

Figure 3A:
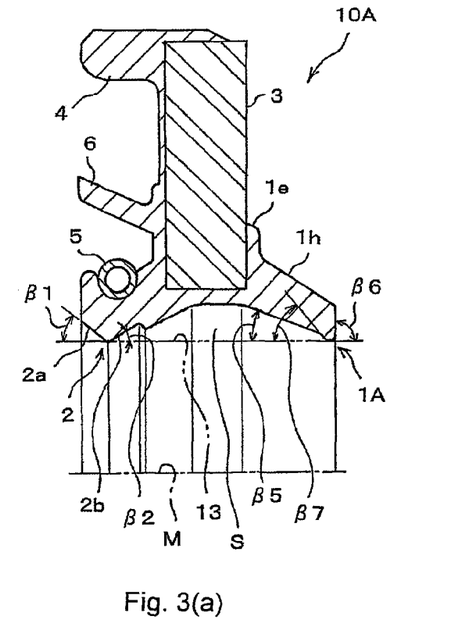
FIG. 3(a) is a sectional view showing an upper half of another example of a high-friction fluid seal in accordance with the present invention.
Figure 3B:
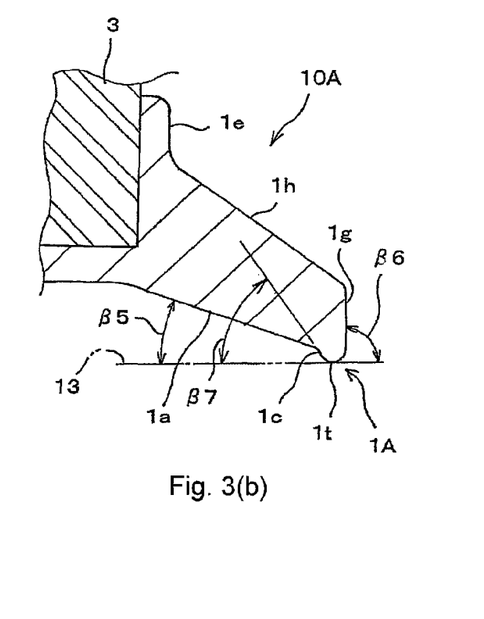
FIG. 3(b) is an enlarged sectional view of a dust lip of FIG. 3(a)
Figure 3C:
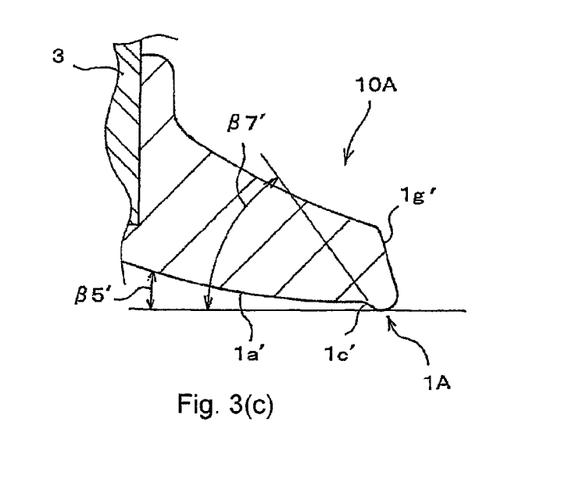
FIG. 3(c) is a service state view of FIG. 3(b)
Figure 3D:
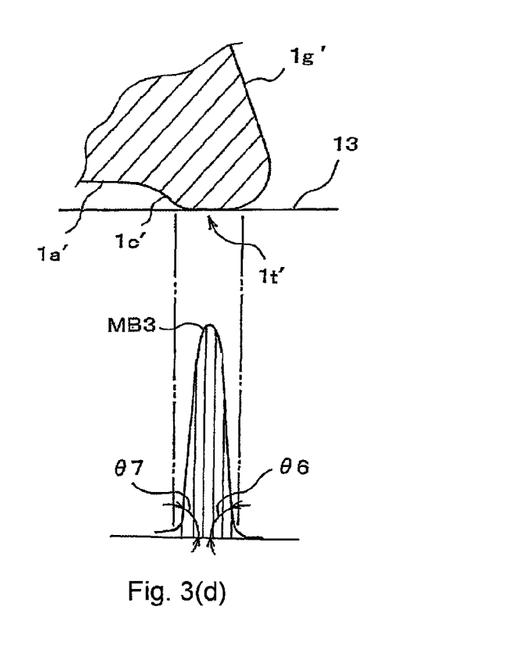
FIG. 3(d) is an explanatory view showing an inclined face of the dust lip shown in FIG. 3(b) and the relationship between surface pressure distribution and maximum surface pressure inclination.

FIG. 3(a) is a sectional view showing an upper half of another example of the high-friction fluid seal in accordance with the present invention, FIG. 3(b) is an enlarged sectional view of a dust lip of FIG. 3(a), FIG. 3(c) is a service state view of FIG. 3(b), and FIG. 3(d) is an explanatory view showing an inclined face of the dust lip shown in FIG. 3(b) and the relationship between surface pressure distribution and surface pressure inclination. In FIGS. 3(a)-3(d), the same symbols are applied to elements that have already been explained, and the explanation of these elements is omitted.

This high-friction fluid seal 10A differs from the high-friction fluid seal 10 shown in FIG. 2 in that the entire shape of a dust lip 1A is common to the dust lip 21 of the fluid seal 30 shown in FIGS. 1(a)-1(e).

In addition, the dust lip 1A is provided with highly inclined face 1c on the inside at the tip end thereof. As shown in FIG. 3(a), highly inclined face angle β7 between the highly inclined face 1c and the contact surface (the piston rod 13) is larger than an angle β5 between a general inclined face 1f on the inside of the dust lip 1A and the contact surface, and thereby is made larger than the fluid-side inclination angle β1 of the fluid seal lip 2. Thereby, the working fluid film thickness h3 formed on the extension stroke of the dust lip 1A is made smaller than the working fluid film thickness h1 formed on the extension stroke of the fluid seal lip 2.

The high-friction fluid seal 10A is common to the high-friction fluid seal 10 shown in FIG. 2 except the above-described features, and the basic shape of the dust lip 1A differs from the tip end part shape of the relating dust lip 1A because the highly inclined face 1c is provided.

That is to say, the dust lip 1A of the high-friction fluid seal 10A includes a dust lip fluid-side inclined face 1a, a dust lip outer-side inclined face 1g, an upper inclined part 1h, and a fixing part 1e, that are the same as the dust lip fluid-side inclined face 21a, the dust lip outer-side inclined face 21b, the upper inclined part 21d, and the fixing part 21e, respectively, that the dust lip 21 of the fluid seal 30 shown in FIGS. 1(a)-1(e) includes.

The tip end part of the dust lip fluid-side inclined face 1a is continuous with the highly inclined face 1c via an inflection point. The highly inclined face 1c is continuous with the dust lip outer-side inclined face 1g while forming a projecting part 1t having a rounded cross section in the tip end part of the dust lip 1A.

The projecting part 1t having a rounded cross section that connects the inclined face 1c and the dust lip outer-side inclined face 1g to each other is a part corresponding to a part in which the fluid-side inclined face 21a and the dust lip outer-side inclined face 21b of the dust lip 1 of the fluid seal 30 shown in FIG. 1 are connected to each other. In the dust lip 1A, the projecting part 1t is a projecting part formed resultantly to provide the highly inclined face 1c in the tip end part of the dust lip fluid-side inclined face 1f.

The angles between the dust lip fluid-side inclined face 1a, the dust lip outer-side inclined face 1g, and the highly inclined face 1c and the contact surface (rod axis center) of the piston rod 13 to be sealed are called the dust lip fluid-side inclination angle β5, a dust lip out-side inclination angle β6, and the highly inclined face angle β7, respectively.

As seen from FIG. 3(a), the relationship between the inclination angles in the non-service state of the high-friction fluid seal 10A is a relationship such that the dust seal lip fluid-side inclination angle β5 is smaller than the fluid seal lip fluid-side inclination angle β1, but the highly inclined face angle β7 is larger than the fluid seal lip fluid-side inclination angle β1.

Also, to perform the respective basic function of the fluid seal lip 2 and the dust lip 1A, the fluid seal lip fluid-side inclination angle β1 is made larger than the fluid seal lip dust-side inclination angle β2, and the highly inclined face angle β7 is made smaller than the dust lip outer-side inclination angle β6.

When the high-friction fluid seal 10A configured as described above is mounted on the shock absorber 20, the dust lip 1A is deformed as shown in FIG. 3(c). FIG. 3(d) is an enlarged sectional view of a contact part between the deformed dust lip 1A and the piston rod 13, additionally showing a surface pressure distribution.

Also, as compared with the dust lip 21 of the fluid seal 30 shown in FIG. 1, only the projecting part 1t that is shorter in the axial direction of the piston rod 13 comes into contact with the rod 13 and is deformed, and the dust lip fluid-side inclined face 1f continuous with the highly inclined face 1c forming the projecting part 1t does not come into contact with the rod 13. Therefore, the dust lip 1A comes into contact with the piston rod 13 in a contact part that is shorter in the axial direction, and therefore only the projecting part 1t of the dust lip 1A takes part in the surface pressure distribution, so that a surface pressure distribution MB3 as shown in FIG. 3(d) is formed.

Resultantly, a result is obtained that a dust lip fluid-side maximum surface pressure inclination θ7 becomes remarkably larger than the fluid seal lip fluid-side maximum surface pressure inclination θ1, and thereby the dust-side extension stroke fluid film thickness h3 is made an order of magnitude smaller than the fluid-side extension stroke fluid film thickness h1.

Also, it is proved that the surface pressure distribution MB3 takes a mountain shape deviating as a whole to the right-hand side (the outer side) in FIGS. 1(a)-1(e) though slightly, and a dust lip outer-side maximum surface pressure inclination θ6 is larger than the dust lip fluid-side maximum surface pressure inclination θ7, so that a function as a dust lip is also fulfilled.

Therefore, according to this high-friction fluid seal 10A, the effects of the above-described first invention, second invention, and third invention can be achieved.

Also, the shape of the dust lip 1A is almost the same as the shape of the dust lip 21 of the fluid seal 30 shown in FIGS. 1(a)-1(e) except the highly inclined face 1c part, so that similar strength against transverse amplitude can be achieved.

Since the dust lip is made of a viscoelastic material such as rubber, a permanent set phenomenon occurs intrinsically in a long term. If permanent set occurs in the tip end part of the dust lip, both of the surface pressure and the surface pressure inclination decrease with respect to the initial values, so that the fluid film thickness also increases.

However, in the case of the present invention, since the dust lip 1A comes into contact with the piston rod 13 by the projecting part 1t only, the original value of surface pressure distribution can be set high. Therefore, even if the permanent set of material occurs, the fluid film intercepting function can be performed stably.

That is to say, according to the high-friction fluid seal 10A, since the highly inclined face 1c is provided on the dust lip 1A, the effects of the above-described first invention, second invention, and third invention can be achieved, and additionally an effect can be achieved that the dust lip 1A is more invulnerable to the permanent set of material while the function of dust lip of the fluid seal having the basic configuration is maintained.

Third Embodiment

Figures 4A, 4B:
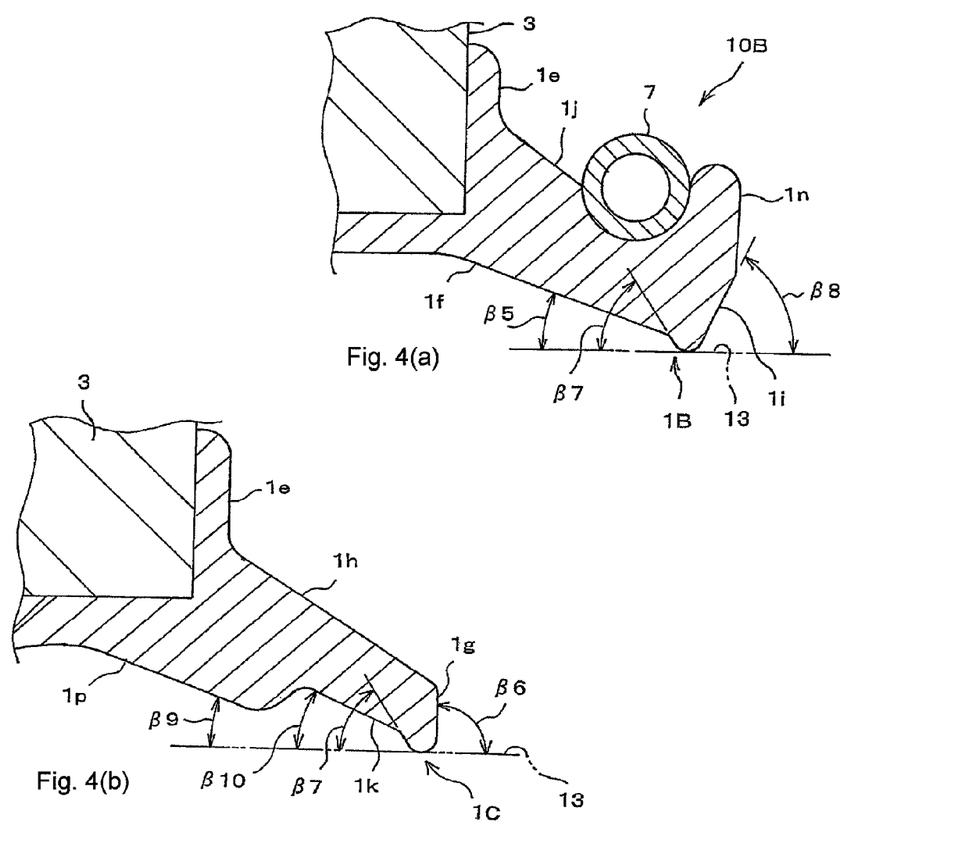
FIGS. 4(a), 4(b) and 4(c) are sectional views showing dust lip parts of other examples of a high-friction fluid seal in accordance with the present invention.
Figure 4C:
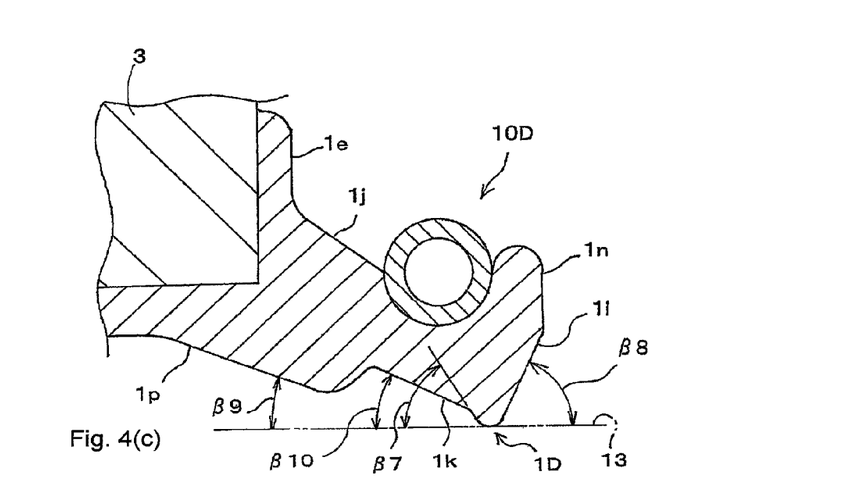
Figure 5A:
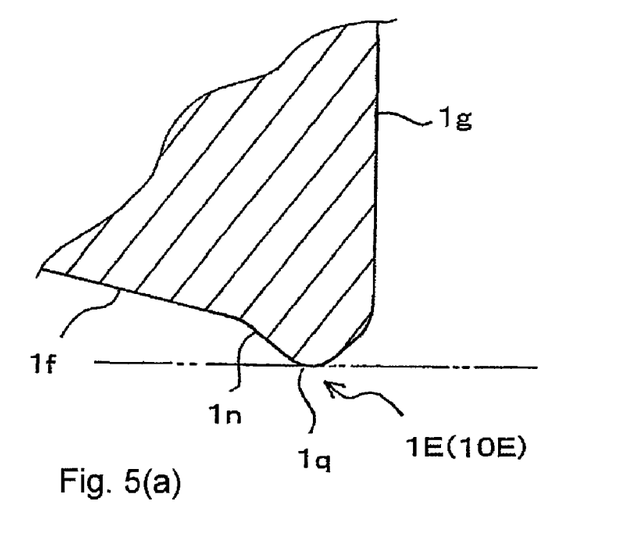
FIGS. 5(a) and 5(b) are enlarged sectional views showing tip end parts of dust lips of other examples of a high-friction fluid seal in accordance with the present invention.
Figure 5B:
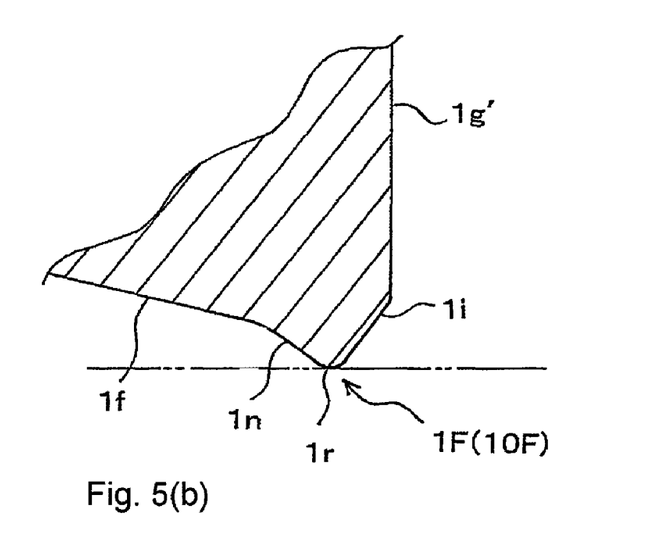

FIGS. 4(a), 4(b) and 4(c) are sectional views showing dust lip parts of other examples of the high-friction fluid seal in accordance with the present invention, and FIGS. 5(a) and 5(b) are enlarged sectional views showing tip end parts of dust lips of other examples of the high-friction fluid seal in accordance with the present invention.

A high-friction fluid seal 10B shown in FIG. 4(a) differs from the high-friction fluid seal 10A shown in FIGS. 3(a)-3(d) in that a garter spring 7 is provided in the outer peripheral part of a dust lip 1B, a small inclined face 1i directed to the tip end part is provided on the contact side with the piston rod 13 of a dust lip outer-side inclined face 1n so as to correspond to the garter spring 7, and an upper inclined part 1j has a shape such as to fittingly receive the garter spring 7.

The angle between the small inclined face 1i and the contact surface (rod axis center) of the piston rod 13 to be sealed is called a small inclined face angle β8.

According to the high-friction fluid seal 10B provided with the garter spring 7 on the dust lip 1B as described above, in addition to the effect of the high-friction fluid seal 10A shown in FIG. 3, the tightening force of the dust lip 1B can be increased, and thereby a decrease in tightening force of the lip 1B caused by permanent set can be compensated.

A high-friction fluid seal 10C shown in FIG. 4(b) differs from the high-friction fluid seal 10A shown in FIGS. 3(a)-3(d) in that a dust lip 1C has a two-stage configuration of fluid-side inclined face provided with a stepped concave face 1k on the inside, and a far inclined face 1p on the further inside is a little larger than the dust lip fluid-side inclined face 1f in FIGS. 3(a)-3d so as to correspond to the two-stage configuration.

The angles between the stepped concave face 1k and the far inclined face 1p and the contact surface (rod axis center) of the piston rod 13 to be sealed are called a stepped concave face inclination angle β10 and a far inclined face inclination angle β9, respectively.

According to the high-friction fluid seal 10C in which the dust lip 1C has the two-stage configuration of fluid-side inclined face on the inside, the flexibility of the tip end of the lip 1C increases, so that the transverse vibration traceability of the dust lip 1C can be improved.

A high-friction fluid seal 10D shown in FIG. 4(c) has both of the configurations of the high-friction fluid seal 10B shown in FIG. 4(a) and the high-friction fluid seal 10C shown in FIG. 4(b), and therefore can achieve the effects of both the fluid seals synergistically.

A high-friction fluid seal 10E shown in FIG. 5(a) differs from the high-friction fluid seal 10A shown in FIGS. 3(a)-3(d) in that the tip end part of a dust lip 1E is not a projecting part having a rounded cross section as a whole, and is a projecting part 1q provided with a straight line face 1n on the inside.

Also, a high-friction fluid seal 10F shown in FIG. 5(b) differs from the high-friction fluid seal 10B shown in FIG. 4(a) in that the tip end part of a dust lip 1F is a projecting part 1r provided with the straight line face 1n as shown in FIG. 5(a).

Also, like the dust lip 1B shown in FIG. 4(a), the dust lip 1F has a tip end part shape having the straight line shaped small inclined face 1i in place of the rounded face on the outer side as well.

That is to say, in both of the above-described high-friction fluid seals 10E and 10F, the highly inclined faces of the dust lips 1E and 1F are the straight line faces 1n, and the lip tip end part does not have a rounded cross section as a whole. Even in such configurations, the high-friction fluid seals 10E and 10F can achieve the same effects as those of the high-friction fluid seals 10A and 10B.

In the case of both of the dust lips 1E and 1F as well, in the figures, the tip end part has a minute rounded part. This minute rounded part is inevitably produced due to the molding process of fluid seal integrally molded using a rubber material. Also, the minute rounded part is provided to improve the sealing ability by making the axial contact position with the contact surface of the lip equal around the entire circumference.

Forth Embodiment

FIG. 6 is a longitudinal sectional view showing one example of a shock absorber using the high-friction fluid seal shown in FIG. 3(a).

This shock absorber 20 includes a cylinder body 11, a piston rod 14 provided with a piston, not shown, and a rod guide 15 that is provided on the opening side of the cylinder body 11 to slidably guide the piston rod 14. The high-friction fluid seal 10A is tightenedly fixed between the upper end of the rod guide 15 and the upper part of the cylinder body 11.

The cylinder body 11 includes an outer tube 11b and an inner tube 11a that are disposed coaxially. Between the opening end part of the inner tube 11a and the inner periphery of the opening end part of the outer tube 11b, the rod guide 15 is provided.

On the upper surface of the rod guide 15, the oil seal 10A is placed. By bending the upper end part of the outer tube 11b to the inside, the outer tube 11b, the oil seal 10a, and the rod guide 15 are stakingly fixed as a unit.

In a gas chamber A formed between the inner periphery of the outer tube 11b and the outer periphery of the inner tube 11a, high-pressure gas is filled. A space between the inner periphery of the inner tube 11a and the piston rod 14 is a fluid chamber L filled with a working fluid.

The rod guide 15 is formed by press molding one metal sheet, and includes an inside support part 15a the outer peripheral surface of which is press fitted on the inner peripheral surface of the inner tube 11a, an outside support part 15b the outer peripheral surface of which is similarly press fitted on the inner peripheral surface of the outer tube 11b, and a connecting part 15c. The connecting part 15c connects both of the support parts 15a and 15b to each other, and the lower surface thereof comes into contact with the opening end part of the inner tube 11a to perform positioning of the rod guide 15.

The inside support part 15a is a guide part the inner peripheral surface of which guides the piston rod 14, and is configured so that the piston rod 14 is slidably guided via a ring-shaped bush 16 having abrasion resistance, which is press-fittingly fixed to the guide part.

The connecting part 15c is provided with a ring-shaped projecting part 15d in the upper surface outer peripheral part thereof. By placing the insert metal 3 of the oil seal 10A on the upper surface of the projecting part 15d, the oil seal 10A is positioned at a normal position with respect to the rod guide 15.

This shock absorber 20 has the above-described basic configuration. By regulating the flow rate of working fluid filled by a flow regulating means, not shown, the movement of the piston is regulated, thereby fulfilling the shock absorbing function. In addition, this shock absorber 20 has the high-friction fluid seal 10A having the above-described features. Therefore, the effect of the high-friction fluid seal 10A can be achieved as the shock absorber 20.

The high-friction fluid seal and the shock absorber in accordance with the present invention are not limited to the above-described embodiments. Various modifications and combinations can be made in a scope described in claims and in a scope of the embodiments, and these modifications and combinations are embraced in the scope of right.

The working fluid includes a working oil, a liquid containing water having properties as the working fluid for a shock absorber, a high-molecular liquid, and a mixture of gas and liquid.

The high-friction fluid seal in accordance with the present invention can be used for fluid pressure equipment having the similar problems to be solved, not limited to the shock absorber described in the above-described examples. Also, the shock absorber can be used for a part having the similar problems to be solved, not limited to a suspension of a vehicle or the like.

The high-friction fluid seal in accordance with the present invention, which is used for high-friction sealing, can be used in industrial fields in which the solution of a problem of working fluid leakage from a fluid lip is demanded while the fluid seal is provided with a dust lip capable of being used for a shock absorber for a suspension of a vehicle or the like.

The shock absorber in accordance with the present invention is suitable to the case where the high-friction fluid seal accepts the above-described demand.

What is claimed is:

1. A high-friction fluid seal used for high-friction sealing, comprising a fluid seal lip provided on the working fluid filling side to intercept a working fluid; and a dust lip provided on the working fluid non-filling side (the outer side) of the fluid seal lip to intercept dust coming from the outside and prevent leakage of the working fluid to the outside,
   wherein by making an angle between an inclined face on the fluid seal lip side of the dust lip and a contact surface with which the fluid seal lip is in contact larger than an angle between an inclined face on the working fluid filling side of the fluid seal lip and the contact surface, the thickness of a working fluid film formed on the extension stroke by the dust lip is smaller than the thickness of a working fluid film formed on the extension stroke by the fluid seal lip, thereby substantially preventing the leakage of the working fluid past the dust lip to the outside.

2. The high-friction fluid seal according to claim 1, wherein a highly inclined face is provided on the inside of the tip end of the dust lip, and an angle between the highly inclined face and the contact surface is made larger than an angle between a general inclined face on the inside of the dust lip and the contact surface, whereby the thickness of the working fluid film formed on the extension stroke by the dust lip is made smaller than the thickness of the working fluid film formed on the extension stroke by the fluid seal lip.

3. A cylinder-type shock absorber using a working fluid, wherein the high-friction fluid seal described in claim 2 is used as a seal between a piston rod and a cylinder body.

4. A cylinder-type shock absorber using a working fluid, wherein the high-friction fluid seal described in claim 1 is used as a seal between a piston rod and a cylinder body.

5. A high-friction fluid seal used for high-friction sealing, comprising a fluid seal lip provided on the working fluid filling side to intercept a working fluid; and a dust lip provided on the working fluid non-filling side (the outer side) of the fluid seal lip to intercept dust coming from the outside and prevent leakage of the working fluid to the outside, wherein by making a maximum surface pressure inclination on the fluid seal lip side of the dust lip larger than a maximum surface pressure inclination on the working fluid filling side of the fluid seal lip, the thickness of the working fluid film formed on the extension stroke by the dust lip is made smaller than the thickness of the working fluid film formed on the extension stroke by the fluid seal lip, thereby substantially preventing the leakage of the working fluid past the dust lip to the outside.

6. A cylinder-type shock absorber using a working fluid, wherein the high-friction fluid seal described in claim 5 is used as a seal between a piston rod and a cylinder body.

7. A cylinder-type shock absorber using a working fluid, wherein the high-friction fluid seal described in claim 2 is used as a seal between a piston rod and a cylinder body.

8. A high-friction fluid seal used for high-friction sealing, comprising:
   a fluid seal lip provided on the working fluid filling side to intercept a working fluid;
   a dust lip provided on the working fluid non-filling side (the outer side) of the fluid seal lip to intercept dust coming from the outside and prevent leakage of the working fluid to the outside;
   the high-friction fluid seal further comprising a first angle, said first angle being between an inclined face on the fluid seal lip side of the dust lip and a contact surface with which the fluid seal lip is in contact; and
   a second angle, said second angle being between an inclined face on the working fluid filling side of the fluid seal lip and the contact surface, wherein the first angle is made larger than the second angle, and wherein making the first angle larger than the second angle results in the thickness of a working fluid film formed on the extension stroke by the dust lip being smaller than the thickness of a working fluid film formed on the extension stroke by the fluid seal lip, thereby substantially preventing the leakage of the working fluid past the dust lip to the outside.

* * * * *